United States Patent
Kanaris

(10) Patent No.: US 6,938,754 B2
(45) Date of Patent: Sep. 6, 2005

(54) SELF-CLEANING CONVEYOR ROLLER

(75) Inventor: Alexander D Kanaris, Richmond Hill (CA)

(73) Assignee: Van der Graaf Inc., Brampton (CA)

( * ) Notice: Subject to any disclaimer, the term of this patent is extended or adjusted under 35 U.S.C. 154(b) by 0 days.

(21) Appl. No.: 10/372,805

(22) Filed: Feb. 26, 2003

(65) Prior Publication Data
US 2003/0173190 A1 Sep. 18, 2003

(30) Foreign Application Priority Data
Mar. 15, 2002 (CA) .............................................. 2367967

(51) Int. Cl.⁷ ........................ B65G 45/00; B65G 45/10; B65G 45/20; B65G 45/24; B65G 45/26
(52) U.S. Cl. ........................ 198/494; 198/501; 198/835; 198/842
(58) Field of Search ................................ 198/494, 501, 198/834, 835, 842

(56) References Cited

U.S. PATENT DOCUMENTS

| | | | | |
|---|---|---|---|---|
| 1,980,777 A | * | 11/1934 | Zollinger | 198/501 |
| 3,661,246 A | * | 5/1972 | Faunce et al. | 198/842 |
| 3,972,414 A | * | 8/1976 | Conrad | 198/808 |
| 4,283,184 A | * | 8/1981 | Berg | 198/834 |
| 4,337,672 A | * | 7/1982 | Shiber | 198/834 |
| 4,449,958 A | * | 5/1984 | Conrad | 198/834 |
| 5,119,924 A | * | 6/1992 | Kaminski | 198/834 |
| 6,672,449 B2 | * | 1/2004 | Nakamura et al. | 198/835 |

* cited by examiner

Primary Examiner—Gene O. Crawford
(74) Attorney, Agent, or Firm—Eugene J. A. Gierczak

(57) ABSTRACT

A self cleaning conveyor roller for supporting a conveyor media carrying contaminant materials. The conveyor roller consists of a drum defining a support surface, having a generally cylindrical shape, and being adapted to be supported for rotation, for supporting a conveyor media. The conveyor roller has a plurality of abutments on the support surface, raised above the support surface, and defining a series of spaced apart conveyor media support ridges lying on a circular configuration, concentric with the drum. The abutments are arranged in generally chevron shapes, around the drum. During rotation of the conveyor roller the abutments cause any debris or contaminants between the roller and the conveyor media to be guided out of the conveyor system. Also disclosed is a method of cleaning a conveyor roller.

9 Claims, 3 Drawing Sheets

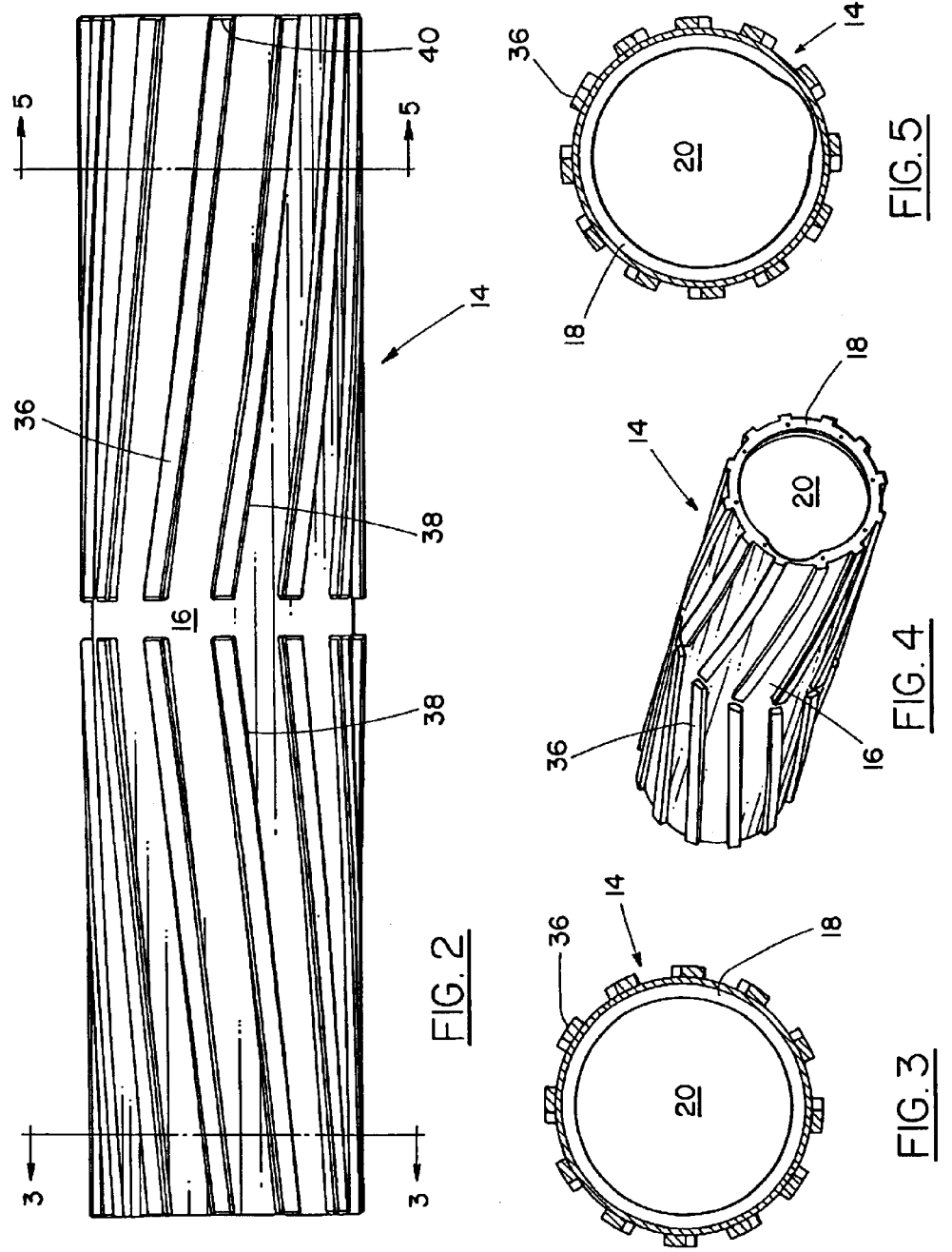

SELF-CLEANING CONVEYOR ROLLER

FIELD OF THE INVENTION

The present invention relates to a conveyor for transport of material containing contaminants. In particular the invention relates to a self-cleaning conveyor roller.

BACKGROUND OF THE INVENTION

Numerous types of conveyor roller systems have been proposed. Most known conveyor roller systems consist of a continuous belt or conveyor media which travels over a series of rollers. The rollers may be simple shafts on which may be mounted various forms of sprockets, or drive means for supporting the conveyor media. More advanced conveyor systems use enclosed and sealed drive rollers with the drive motors contained inside the rollers themselves.

The internal roller drives are sealed, and are not liable to contamination from the product being carried. Furthermore the product itself will not be contaminated by the drive system, which may require lubricants, and which may accumulate dirt, if exposed.

Conveyor systems are used in many industries to aid in the progressive movement of material from one place to another. This is well known in the art of conveyors. In many instances movement of specific types of material may cause damage to the conveyor system. Material may slip under the conveyor media and cause the conveyor rollers to become jammed, in the case of solid material contaminates. Contamination by liquid material may cause slippage of the conveyor media with relation to the conveyor rollers.

In the specific case of asphalt recycling, the application has a high amount of petroleum or oil that leeches out and attacks the conveyor media or belting and may adhere to either the roller face or the media. In some cases coverings known as "lagging" are provided on the rollers. Such lagging can also become contaminated. If the oil is allowed to build up on the roller, a potential problem of belt slippage on the roller may occur.

Transverse movement of the media across the roller is known as "tracking". This may also be caused by build up of contaminants such as oil.

Contamination of the conveyor system in such a way may cause undue wear on the system or substantial downtime while the contaminants are cleared from the system. For many manufacturers, "stoppage" of a work line could cause significant losses. There is a need for a conveyor system that addresses the problem of clearing contamination from the conveyor system while in operation.

BRIEF SUMMARY OF THE INVENTION

The present invention reduces or eliminates oil or other contaminant build up and maintains proper belt traction, and extends belt life in environments where the conveyor system may become contaminated.

The invention provides a self-cleaning conveyor roller capable of guiding contaminates from between the conveyor media and the conveyor rollers for disposal outside the conveyor system. Hence, by removing the contaminate, the friction between the conveyor media and the conveyor rollers is maintained and slippage of the conveyor media is avoided.

In accordance with a first aspect of the present invention there is provided a self cleaning conveyor roller for supporting a conveyor media carrying contaminant materials. The conveyor roller advantageously has a drum defining a support surface, having a generally cylindrical shape, and being adapted to be supported for rotation, for supporting a conveyor media, and self-cleaning devices on the drum.

In a further aspect, the conveyor roller may have a plurality of abutments of generally rectangular shape in section on the support surface, raised above the support surface, and defining a series of spaced apart conveyor media support surfaces lying on a circular configuration, concentric with the drum.

The drum defines a central axis and the abutments may extend along the surface of the drum along axes which lie obliquely relative to the central axis of the drum. The abutments may be arranged in two groups, along opposite ends of the drum. One group of abutments are spaced from the abutments in the other group. The spacing between the two groups of abutments defines a central area of the drum, intermediate its two ends.

In a still further aspect, the groups of abutments may be arranged with the abutments in one group lying at first oblique axes relative to the central axis, and wherein the abutments in the other group lie along a second oblique axes relative to the central axis, the abutments on respective first and second oblique axes defining a series of generally chevron shapes, around the drum.

In still a further aspect, the invention provides a method of continuously clearing contaminants from a conveyor system and having an endless belt of conveyor media, and support rollers supporting the belt around which the belt runs, and wherein at least one of the rollers is equipped with contaminant clearing abutments, and comprises the steps of continuously rotating the rollers, thereby moving the belt there around; wherein some of the contaminant material may pass between the belt and the rollers; further comprising the steps of continuously collecting the contaminant material between the abutments, and causing the contaminant material to flow along the abutments to either end of the rollers; allowing the contaminant material to be ejected from between the rollers and the belt at either end of the rollers.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 2 is a front view of a conveyor roller;

FIG. 3 is a cross section of the conveyor roller along section line 3—3;

FIG. 4 is a perspective view of the conveyor roller;

FIG. 5 is a cross section of the conveyor roller along section line 5—5;

DESCRIPTION OF A SPECIFIC EMBODIMENT

Figure 1:
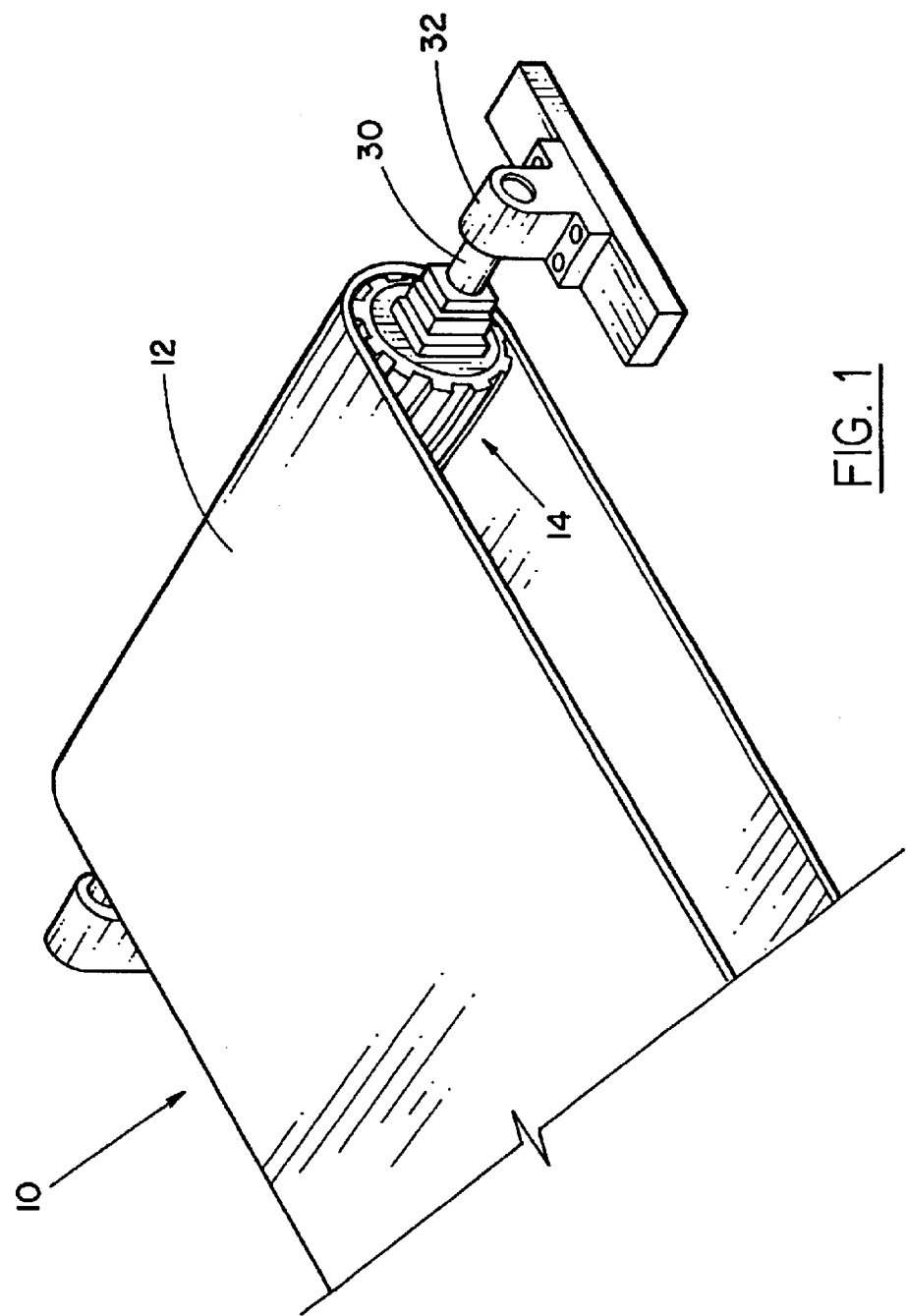
FIG. 1 is a perspective view of a typical conveyor system to which the invention finds a major application.

As shown in FIG. 1, the conveyor system (10) includes a conveyor media (12) supported on a self-cleaning conveyor roller (14). The conveyor media (12) is a continuous driven belt or mesh of the type well known in the art and therefor requires no further description.

There will be at least two rollers, one at each end of this endless belt or conveyor media (12). Both rollers may be equipped with the invention if desired.

The self-cleaning conveyor roller (14) consists of a cylindrical drum (16) having an outer support surface (18), an inner hollow chamber (20) and first and second ends (22,24). The first and second ends (22,24) define passage openings (26). Passage openings (26) are for accommodating bearings (28). Shaft (30) passes through hollow chamber (20) and extends through bearing (28) within passage openings (26). Shaft (30) is rotatably supported on one or both first and second ends (22,24) by brackets (32).

Figure 6:
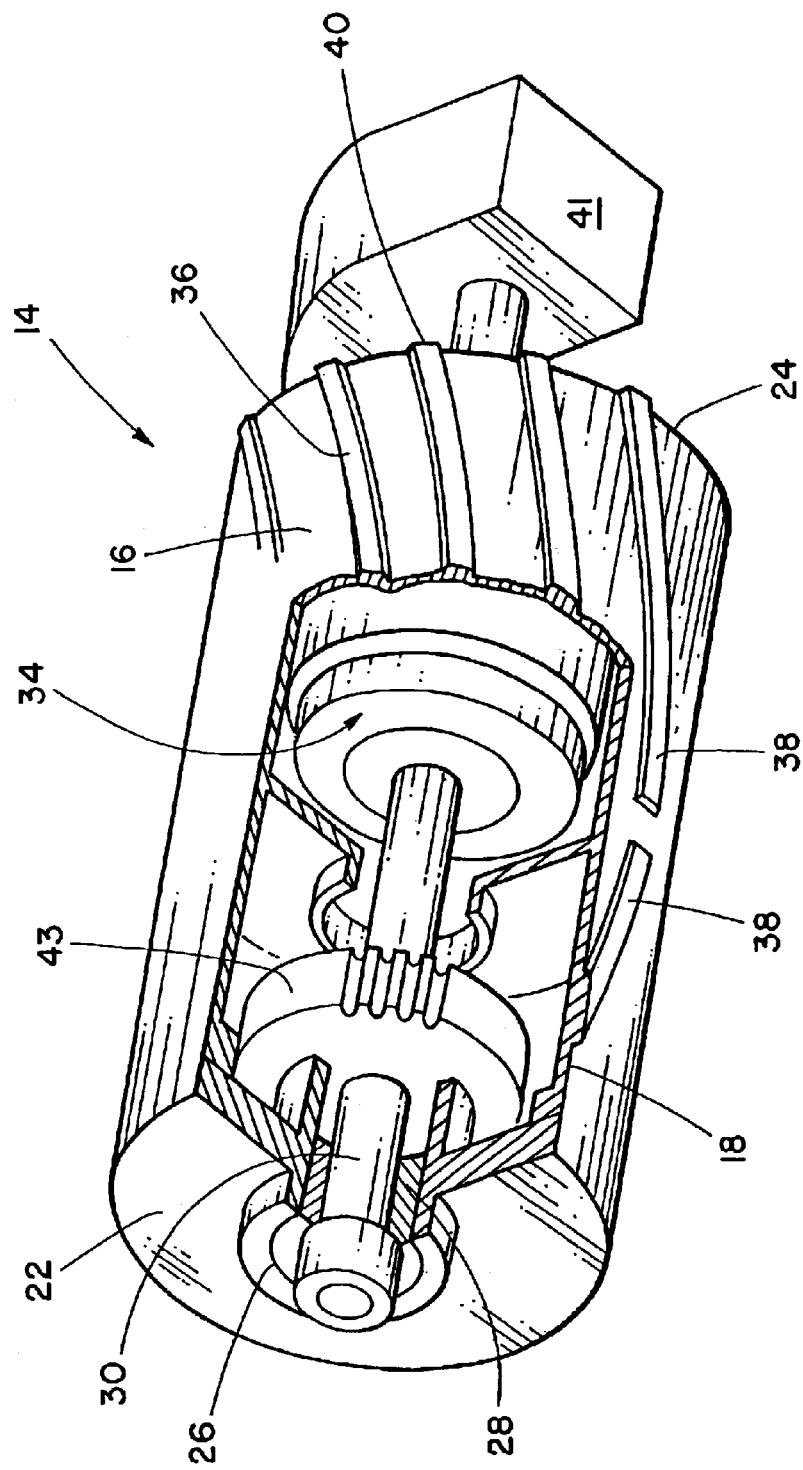
FIG. 6 is a perspective of a conveyor roller with a cut away section showing the interior drive system within the conveyor roller.

The self-cleaning conveyor roller (14) is rotated by drive means (34) (FIG. 6). In the present embodiment the drive means (34) is internally mounted in the cylindrical drum (16), but it should be noted that other embodiments may mount the drive means (34) externally. Both internal and external drive means are well known in the art of conveyor systems (10) and therefor require no further description.

Abutments (36) are provided on outer support surface (18) of cylindrical drum (16) in a circular configuration, concentric with cylindrical drum (16). Abutments (36) provide support ridges on which said conveyor media is supported clear of the actual surface of the roller. In the embodiment illustrated, abutments (36) have a leading end (38), a trailing end (40), a conveyor media contact surface (42) and a generally rectangular shape section but are not limited to a rectangular shape. The abutments (36) are arranged obliquely with respect to the central axis of drum (16) on outer support surface (18). In the illustrated embodiment abutments (36) are arranged in groups of, but not limited to, two, on opposite ends of drum (16) and at opposite oblique angles with respect to each other. In the illustrated embodiment, opposing groups of abutments (36) are arranged such that the leading ends (38) of opposing abutments (36) are orientated toward each other and trailing ends (40) are distant from each other and from leading ends (38). This provides an essentially chevron type arrangement, as illustrated by FIG. 4. The apex of the chevron directed in the same direction as the rotation of drum (16).

FIG. 6 illustrates an example of a self-cleaning conveyor roller (14) with an internal motor (41) and gearbox (43) system such as the type shown in earlier U.S. Pat. No. 5,934,447 Issued Aug. 10, 1999 inventor Kanaris.

When assembled in the conveyor system (10) the conveyor media contact surface (42) of the abutments (36) are frictionally pressed against the undersurface of the conveyor media (12) in a fashion well known in the art. The self-cleaning conveyor roller (14) is mounted such that the apex of the chevron shaped arrangement of abutments (36) is pointed in the direction of rotation. Rotation of the self-cleaning conveyor roller (14) causes the conveyor media (12) to move in the direction of rotation. As the conveyor system (10) operates material that slips between the conveyor media (12) and the self-cleaning conveyor roller (14) is picked up by the oblique abutments (36) and moved outwards in a direction from leading end (38) to trailing end (40) until the material is ejected from either end of the roller (14).

The method of continuously clearing contaminants from a conveyor system (10) and having an endless belt of conveyor media (12), and support rollers (not shown) supporting the belt or conveyor media (12) around which the belt (12) runs, and wherein at least one of the rollers is equipped with contaminant clearing abutments (36), and comprises the steps of continuously rotating the rollers, thereby moving the belt (12) there around.

The contaminant material is allowed to pass between the belt (12) and the rollers (14). The contaminant material is continuously collected between the abutments (36), and the contaminant material is caused to flow along the abutments (36) to either end of the rollers (14). The contaminant material then flows outwardly and is ejected from between the rollers (14) and the belt (12) at either end of the rollers (14).

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A self cleaning conveyor roller for supporting a conveyor media carrying contaminant materials, said conveyor roller comprising: a drum defining a support surface, having a generally cylindrical shape with a common radius, said drum being adapted to be supported for rotation, for supporting said conveyor media; a plurality of abutments on said support surface, said plurality of abutments being arranged in a least two groups thereof raised above said support surface, and defining a series of spaced apart conveyor media support ridges lying on said support surface, wherein said abutments in each of said at least two groups are spaced from said abutments in an adjacent one of said at least two groups of abutments and wherein said spacing between said at least two adjacent groups of abutments define an intermediate area of said drum intermediate its two ends which is free of abutments.

2. A self cleaning conveyor roller for supporting a conveyor media as claimed in claim 1 wherein said drum defines a central axis and wherein said abutments extend along said surface of said drum along axes which lie on axes obliquely relative to said central axis of said drum.

3. A self cleaning conveyor roller for supporting a conveyor media as claimed in claim 2, wherein said abutments are of generally rectangular shape in section.

4. A self cleaning roller for supporting a conveyor media as claimed in claim 1 wherein said groups of abutments are disposed so that leading ends of abutments are oriented toward each other in said intermediate area and said trailing ends of said abutments are remote from each other and said leading ends.

5. A self cleaning roller for supporting a conveyor media as claimed in claim 4 wherein said trailing ends trail behind said leading ends in less than 360 degrees on said surface of said drum.

6. A self cleaning conveyor roller for supporting a conveyor media as claimed in claim 1 wherein said drum defines a central axis and said two groups of abutments are arranged with the abutments in one said group lying at first oblique axes relative to said central axis, and wherein said abutments in the other said group lie along second oblique axes relative to said central axis, said abutments on respective said first and second oblique axes defining a series of generally chevron shapes, around said drum.

7. A self cleaning conveyor roller for supporting a conveyor media as claimed in claim 6 wherein said chevron shapes define central areas intermediate said ends of said drum, and outer areas adjacent each end of said drum, said central areas being directed in the direction of rotation of said drum.

8. A self cleaning conveyor roller for supporting a conveyor media as claimed in claim 7 wherein said outer areas of said chevron shapes lie rearwardly of said central areas of said chevron shapes, in the rotational direction of said drum.

9. A method of continuously clearing contaminants from a conveyor system and having an endless belt of conveyor media, and support rollers supporting said belt around which said belt runs, wherein at least one of said rollers is equipped with contaminant clearing abutments, and comprising the steps of; continuously rotating said rollers, thereby moving said belt there around; allowing said contaminant material to pass between said belt and said rollers; continuously collecting said contaminant material between said abutments, including in an intermediate area defined by at least two spaced groups of said abutments arranged so that leading ends of said groups of abutments are directed towards each other in said intermediate area and causing said contaminant material to flow uninhibited along said intermediate area and abutments, to either end of said rollers, and allowing said contaminant material to be ejected from between said rollers and said belt at either end of said rollers.

* * * * *